T. RHODUS.
VEHICLE WHEEL.
APPLICATION FILED NOV. 1, 1915.
1,230,220.
Patented June 19, 1917.
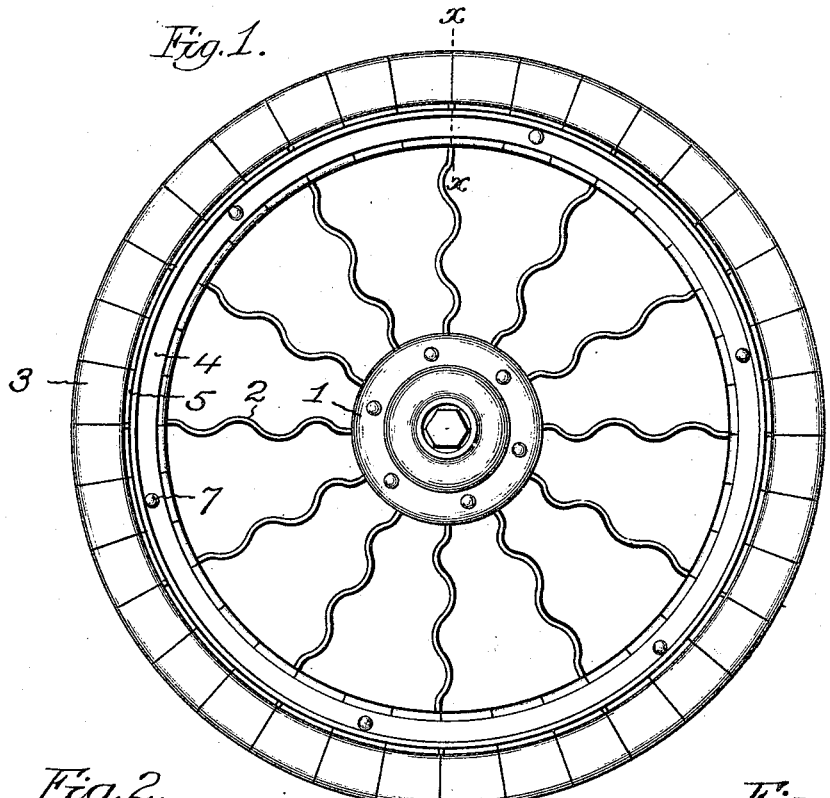
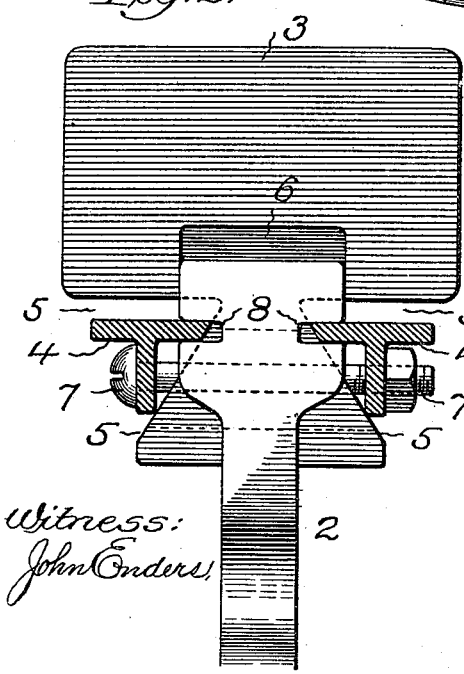
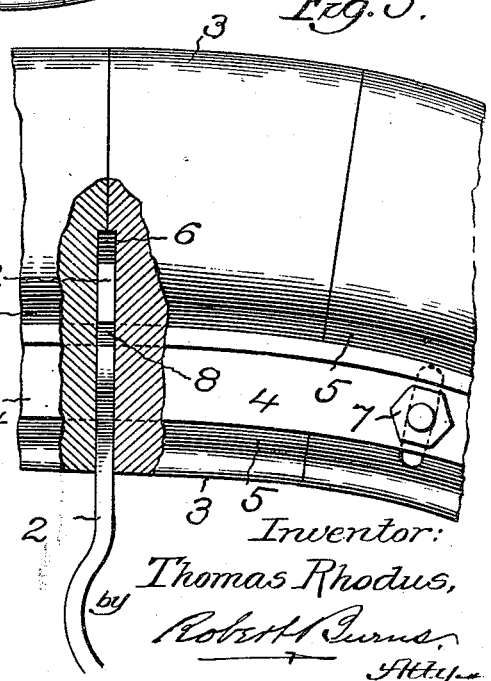
Witness:
John Enders
Inventor:
Thomas Rhodus,
by Robert Burns,
Atty.

UNITED STATES PATENT OFFICE.

THOMAS RHODUS, OF CHICAGO, ILLINOIS, ASSIGNOR TO CHARLOTTE C. RHODUS.

VEHICLE-WHEEL.

1,230,220.	Specification of Letters Patent.	Patented June 19, 1917.

Application filed November 1, 1915. Serial No. 58,955.

*To all whom it may concern:*

Be it known that I, THOMAS RHODUS, a citizen of the United States of America, and a resident of Chicago, in the county of Cook, State of Illinois, have invented certain new and useful Improvements in Vehicle-Wheels, of which the following is a specification.

This invention relates to that class of resilient vehicle wheels in which the annular tread member is yieldingly connected to the inner member by a series of intermediate springs.

And the present improvement has for its object to provide a simple and efficient structural formation and combination of parts in a resilient wheel, whereby the outer ends of the series of intermediate radially disposed spring members or spokes are attached to the tread member in a substantial manner.

Another object is the means for tightening and holding together the series of blocks comprising the annular tread portion of the wheel structure, all as will hereinafter more fully appear.

In the accompanying drawings:—

Figure 1, is an elevation illustrating the general arrangement of parts in the present wheel structure.

Fig. 2, is an enlarged detail transverse section on line $x$—$x$, Fig. 1.

Fig. 3, is a detail side elevation of an outer portion of the wheel structure, with parts broken away and in section.

Similar reference numerals indicate like parts in the several views.

Referring to the drawings, 1 designates the wheel hub of a usual form, and 2 a series of resilient spokes secured at their inner ends to said hub and preferably formed of sinuously shaped bars of resilient material, preferably spring steel. Said spokes 2 constitute the resilient means by which the wheel tread is operatively associated with the wheel hub to absorb the varying impacts to which the wheel tread is exposed in actual use upon rough roadways, and as usual in the present type of wheels.

In the present improvement the wheel tread above referred to, is preferably of the detail sectional formation now to be described.

3 designates a plurality of sector shaped
blocks or sections, formed of any usual and suitable wear resisting material, with their abutting faces preferably formed on lines radial with the axis of the wheel structure so that when connected together by a pair of connecting rings 4 at their opposite sides of connecting rings 4 at their opposite sides an annular tread structure is formed which is adapted to resist distortion from a normal circular form under the varying stresses met with in actual use.

5 designates circumferential recesses or grooves formed in the opposite sides of the annular tread member blocks 3 aforesaid, for the reception of the connecting rings 4 above referred to. In the preferred form of the present invention said recesses form an inclined plane as shown in Fig. 2, to correspond with the shape in cross-section of the preferred form of connecting rings 4.

6 designates transverse recesses formed in some of the sector shaped blocks 3 aforesaid, preferably in the contacting faces of pairs of adjacent blocks 3, so that the individual recess in one block in connection with the like individual recess in an adjacent block 3 will constitute a single receiving recess for the outer end of an individual spoke 2 aforesaid.

In the preferred form of the present invention shown in Figs. 2 and 3, the pair of laterally alined connecting rings 4 aforesaid, are of an angular form in cross-section and have inclined inner faces formed by the inner edges of the two component and angularly disposed webs of each connecting ring 4. Said inclined inner faces of the connecting rings 4 have bearing against the outwardly disposed inclined faces of the circumferential recesses or grooves 5 of the sectional tread member, so that as said pair of connecting rings 4 are drawn toward each other, by means hereinafter described, the action will be to draw the series of tread blocks 3 toward the axis of the wheel structure and bind said blocks together into a rigid annular structure.

7 designates a plurality of transverse adjusting bolts passing preferably through suitably formed orifices in the side webs of the connecting rings 4 aforesaid, and in adjacent tread blocks 3, and adapted in their adjustment to draw the connecting rings 4 together in manner and for the purpose above stated and also to connect them and the wheel tread to the spokes 2.

In the present improvement the series of resilient spokes 2 may be of any usual form, preferably the serpentine flat bar form illustrated in Fig. 1, with their outer ends arranged in the before described series of receiving recesses 6 of the tread blocks 3 to afford an effective engagement of said spokes with the tread member.

8 designates a pair of laterally alined recesses formed near the outer end of the resilient spokes aforesaid, and adapted for holding engagement with the peripheral web portions of the pair of connecting rings 4 aforesaid, to provide a substantial connection between the parts and permit of an adjustment of said confining rings 4 toward each other.

Having thus fully described my said invention what I claim as new and desire to secure by Letters Patent, is:—

1. In a wheel, the combination of a wheel center, an annular tread member comprising a series of blocks and a pair of rigid laterally alined holding rings associated with said blocks, and connecting means between said tread member and the wheel center, said connecting means being adapted to hold said tread member against sidewise movement while permitting sidewise adjustment of said holding rings, substantially as set forth.

2. In a wheel, the combination of a wheel center, an annular tread member comprising a series of blocks having circumferential recesses in their opposite sides and a pair of rigid laterally alined holding rings associated with said blocks, and connecting means between said tread member and the wheel center aforesaid, all portions of said blocks except the portions in said recesses being held away from contact with said holding rings, substantially as set forth.

3. In a wheel tread, the combination of an annular tread member comprising a series of blocks, a pair of rigid laterally alined holding rings associated with said series of blocks, said blocks extending laterally inside of said rings and beyond the parts of said rings which are nearest the centers of said rings, substantially as set forth.

4. In a wheel tread, the combination of an annular member comprising a series of blocks formed with circumferential recesses in their opposite sides, a pair of rigid laterally alined holding rings associated with said blocks, each of said rings being formed with a depressed part held away from said blocks by and between two projecting contact faces, both of said faces having contact with said blocks wholly in said recesses, substantially as set forth.

5. In a wheel, the combination of a wheel center, an annular tread member comprising a series of blocks, a pair of rigid laterally alined holding rings having contact with said blocks, and a series of connecting means between said wheel center and said tread member and extending into recesses in said blocks, said connecting means having engagement with said holding rings, substantially as set forth.

6. In a wheel, the combination of a wheel center, an annular tread member comprising a series of blocks having inclined planes in circumferential recesses in their opposite sides and a pair of rigid laterally alined holding rings associated with said blocks, and connecting means between said tread member and the wheel center aforesaid, no portion of said blocks except the said inclined planes having contact with said holding rings, substantially as set forth.

7. In a wheel, the combination of a wheel center, an annular tread member comprising a series of blocks, a pair of rigid laterally alined holding rings having contact with said blocks, a series of connecting means between said wheel center and said holding rings, said rings engaging said connecting means in transverse slots formed near the outer ends of the connecting means so engaged, substantially as set forth.

8. In a wheel, the combination of a hub, an annular tread member comprising a series of blocks and a pair of rigid laterally alined holding rings associated with opposite sides of said blocks, and a series of spokes between the tread member and the hub aforesaid, the outer ends of said spokes engaging some of said blocks, substantially as set forth.

9. In a wheel, the combination of a hub, an annular tread member comprising a series of blocks and a pair of rigid laterally alined holding rings associated with opposite sides of said blocks, a series of transverse bolts adapted to hold said rings to the sides of said blocks, said rings having extensions overhanging the outer ends of said bolts, and intermediate means resiliently connecting the tread member and hub aforesaid, substantially as set forth.

10. In a wheel, the combination of a hub, an annular tread member comprising a series of blocks and a pair of rigid laterally alined holding rings associated with opposite sides of said blocks, a series of transverse bolts adapted to hold said rings to the sides of said blocks, said tread member extending sidewise as far as one end of each of said bolts, and intermediate means resiliently connecting the tread member and the hub aforesaid, substantially as set forth.

11. In a wheel, the combination of a hub, an annular tread member comprising a series of blocks and a pair of rigid laterally alined holding rings associated with opposite sides of said blocks, portions of said blocks extending sidewise inside of said rings beyond a portion of that part of said rings nearest the hub, and intermediate means resiliently connecting the tread member and the hub aforesaid, substantially as set forth.

12. In a wheel, the combination of a hub, an annular tread member comprising a series of blocks and a pair of rigid laterally alined holding rings associated with opposite sides of said blocks, portions of said blocks extending as far inwardly toward the hub as the portion of said rings adjacent to said blocks, and intermediate means resiliently connecting the tread member and the hub aforesaid, substantially as set forth.

Signed at Chicago, Illinois, this 29th day of October, 1915.

THOMAS RHODUS.

Copies of this patent may be obtained for five cents each, by addressing the "Commissioner of Patents, Washington, D. C."